US005545805A

United States Patent [19]

Chesner

[11] Patent Number: 5,545,805

[45] Date of Patent: Aug. 13, 1996

[54] ENHANCED STABILIZATION OF LEAD IN SOLID RESIDUES USING ACID OXYANION AND ALKALI-METAL CARBONATE TREATMENT

[75] Inventor: Warren H. Chesner, Smithtown, N.Y.

[73] Assignee: Chesner Engineering, PC, Commack, N.Y.

[21] Appl. No.: 485,634

[22] Filed: Jun. 7, 1995

[51] Int. Cl.[6] .......... B09B 3/00

[52] U.S. Cl. .......... 588/256; 588/252; 588/901

[58] Field of Search .......... 588/18, 236, 252, 588/256, 901; 210/751

[56] References Cited

U.S. PATENT DOCUMENTS

| | | | |
|---|---|---|---|
| 3,947,248 | 3/1976 | Powers . | |
| 4,049,462 | 9/1977 | Cocozza . | |
| 4,258,017 | 3/1981 | Gelfand | 423/210 |
| 4,375,986 | 3/1983 | Pichat . | |
| 4,443,415 | 4/1984 | Queneau | 423/68 |
| 4,572,797 | 2/1986 | Silver | 588/236 X |
| 4,645,651 | 2/1987 | Hahn | 423/62 |
| 4,671,882 | 6/1987 | Douglas | 210/720 |
| 4,701,219 | 10/1987 | Bonee . | |
| 4,737,356 | 4/1988 | O'Hara | 423/659 |
| 4,762,623 | 8/1988 | Kapland | 210/751 |
| 4,788,044 | 11/1988 | Corigliano | 423/62 |
| 4,889,640 | 12/1989 | Stanforth | 210/751 |
| 4,891,130 | 1/1990 | Pitts | 208/305 |
| 4,917,733 | 4/1990 | Hansen . | |
| 5,008,017 | 4/1991 | Kiehl et al. | 210/751 X |
| 5,009,793 | 4/1991 | Muller | 210/710 |
| 5,037,479 | 8/1991 | Stanforth | 106/691 |
| 5,045,115 | 9/1991 | Gmunder | 106/709 |
| 5,150,985 | 9/1992 | Roesky | 405/128 |
| 5,162,600 | 11/1992 | Cody et al. | 588/236 |
| 5,193,936 | 3/1993 | Pal | 405/128 |
| 5,202,033 | 4/1993 | Stanforth | 210/747 |
| 5,202,062 | 4/1993 | Baba et al. | 588/18 |
| 5,230,876 | 7/1993 | Hutter | 423/321 |
| 5,245,121 | 9/1993 | Gall et al. | 588/901 X |
| 5,266,203 | 11/1993 | Mukhopadhyay | 210/638 |
| 5,282,977 | 2/1994 | Schinkitz | 210/724 |
| 5,296,293 | 3/1994 | Jobst | 428/403 |
| 5,430,233 | 7/1995 | Forrester | 588/236 |
| B1 3,837,872 | 3/1986 | Conner . | |

OTHER PUBLICATIONS

Wheelabrator Environmental Systems Inc., "The West-Phix® Process" 1994, 4 page advertisement.

*Primary Examiner*—George A. Suchfield
*Attorney, Agent, or Firm*—Alfred M. Walker

[57] ABSTRACT

A process for providing more efficient and effective chemical stabilization of solid residues containing lead is described. The process consists of introducing into the residue, or solutions in contact with these residues, polyprotic acid oxyanions that can form insoluble acid oxyanion-lead complexes in solution. Included in this category of compounds are phosphates, borates, vanadates, selenates, arsenates, carbonates, chromates and sulfates. To maximize the effectiveness of acid oxyanion treatment of lead-bearing residues that also contain noncarbonate hardness producing elements such as calcium and magnesium, the introduction of an alkali-metal carbonate, such as sodium carbonate, along with the acid oxyanion is recommended. This alkali-metal carbonate additive can increase the solubility of acid-oxyanions, particularly in solutions with high levels of calcium and magnesium, thereby promoting the more efficient formation of insoluble lead-oxyanion complexes.

23 Claims, No Drawings

ENHANCED STABILIZATION OF LEAD IN SOLID RESIDUES USING ACID OXYANION AND ALKALI-METAL CARBONATE TREATMENT

BACKGROUND OF THE INVENTION

The most common strategies for the treatment of wastes with potential heavy metal leaching problems can be placed in one of two categories: 1) chemical stabilization or fixation, which includes the treatment of the residue with a chemical additive in such a manner so that the contaminant of interest is converted to its least soluble form, and 2) solidification, which includes the addition of a binder, cement or pozzolan and lime to the residue to produce a matrix of low permeability that retards or reduces the rate of contaminant migration into the surrounding environment. A third, less common, method includes the process of washing the contaminated waste in order to dissolve the metal contaminants contained in the waste, and recapturing the metals from solution in subsequent precipitation or filtering steps.

Probably the most common form of treatment of heavy metal-bearing residues is chemical stabilization using lime or an alternative alkaline reagent to adjust the pH of the residue (or leachate from the residue) to a pH range that will promote the formation of insoluble metal-hydroxy complexes. Many polyvalent metals, however, do not form insoluble hydroxy compounds at elevated pH values and in fact exhibit amphoteric properties. An amphoteric metal is a metal that exhibits high solubility at both a high and low pH and minimum solubility in a very narrow pH range in between. Lead is characteristic of this phenomenon. As a result, the addition of lime to chemically stabilize lead is generally not an effective treatment approach.

In attempts to remedy this problem and to provide for the stabilization of lead over a wider pH range, researchers have proposed the use of other additives. Some of these additives are described in subsequent descriptions of relevant patents.

As will become apparent to those familiar with the chemistry involved in stabilization reactions, many of the processes described in these patents makes use of individual elements that represent the cationic component of polyprotic acid oxyanions. This includes elements such as phosphorus, boron, sulfur and carbon. These elements can form acid oxyanions such as phosphates, borates and sulfates and carbonates in non-reducing aqueous environments. Each acid oxyanion is capable of combining with lead to produce relatively insoluble lead-oxyanion complexes. Each oxyanion also tends to perform best within a certain pH range.

It is of further interest that although polyprotic acid oxyanions can form insoluble lead complexes, these oxyanions will also react with multivalent noncarbonate hardness-producing elements, such as calcium and magnesium, that may be present in the waste material or may be introduced (e.g., calcium hydroxide) as a treatment additive. The term hardness as used herein is meant to refer to soluble divalent compounds and in particular calcium and magnesium. Hardness or hard water is a term that commonly describes waters that contain relatively high concentrations of calcium and magnesium. A soft water contains relatively low concentrations.

The presence of soluble calcium and magnesium (or other multivalent metal cations) will therefore interfere with the effectiveness of acid oxyanion treatment by reacting to produce insoluble calcium and magnesium acid oxyanions such as calcium or magnesium phosphates or sulfates. Due to the presence of these interfering elements, additional quantities of the treatment additive must be added to meet both the noncarbonate hardness demand and the heavy metal (i.e., lead) demand of the waste. It is noteworthy that calcium is commonly introduced in the form of quicklime or hydrated lime to many solid residues, thereby inhibiting the effectiveness of the aforementioned acid oxyanions.

Among prior art descriptions that are reviewed are the following:

References Cited
U.S. PAT. DOCUMENTS

| | | |
|---|---|---|
| 4,049,462 | 9/1977 | Cocozza |
| 4,375,986 | 3/1983 | Pichat |
| B1 3,837,872 | 2/1986 | Connor (Reexamination Certificate) |
| 4,443,415 | 4/1984 | Queneau et al. |
| 4,645,651 | 2/1987 | Hähn et al. |
| 4,671,882 | 6/1987 | Douglas |
| 4,701,219 | 10/1987 | Bonee |
| 4,737,356 | 4/1988 | O'Hara et al. |
| 4,891,130 | 1/1990 | Pitts |
| 4,917,733 | 4/1990 | Hansen |
| 5,009,793 | 4/1991 | Muller |
| 5,037,479 | 8/1991 | Stanforth |
| 5,045,115 | 9/1991 | Gmunder et al. |
| 5,150,985 | 9/1992 | Roesky et al. |
| 5,193,936 | 3/1993 | Pal et al |
| 5,202,033 | 4/1993 | Stanforth |
| 5,230,876 | 7/1993 | Hutter |

In U.S. Pat. No. 4,737,356, O'Hara and Surgi describe a stabilization process in which soluble phosphate and lime is added to the residues from municipal waste combustors to control lead and cadmium solubility. Although the authors do not describe the specific mechanisms involved in the fixation process, the process as outlined makes use of phosphorous, which comprises the cationic portion of the phosphoric acid oxyanion, to form insoluble lead-phosphate complexes, and lime to control the pH in an elevated range and to complex cadmium into insoluble hydroxy-cadmium compounds (e.g., cadmium hydroxide). It is noteworthy that the inventors stress the need for the presence of a free lime source to achieve effective stabilization of lead and cadmium.

In U.S. Pat. No. 4,671,882 Douglas describes a similar process in which phosphorous and lime are added to hazardous sludges to form metal phosphates. The major difference between this process and the O'Hara el. al process appears to be the application of the former to the stabilization of municipal waste combustor residue and the latter to the addition of the lime and phosphorous as pan of wastewater treatment operations in which coagulants are also added to help precipitate the resulting sludges.

In U.S. Pat. No. 5,037,479, Stanforth describes a method for treating lead, cadmium and zinc in which phosphorus, in the form of phosphate salts or phosphoric acid, and boron, in the form of boric acid, is added to a waste product containing the aforementioned metals, along with buffering agents (e.g., magnesium oxides, magnesium hydroxides, calcium carbonate, and magnesium carbonate). Stanforth claims that such an approach provides stabilization of lead, cadmium and zinc when subjected to acidic leaching tests or distilled water tests. In effect, Stanforth's approach uses the proposed buffering agents to neutralize the acid, in acidic leaching tests, to maintain an alkaline pH condition where zinc and cadmium will form insoluble carbonates or hydroxides complexes, and where lead will combine with phosphates or borates, both of which are polyprotic acid oxyanions, to form insoluble lead-phosphate or lead-borate complexes. The basic approach is similar to the O'Hara and Douglas processes. It is noteworthy that Stanforth recommends the introduction of buffering agents, which include calcium and magnesium carbonates, to assist in controlling the pH of the waste product. There is no recognition by Stanforth of the interfering effects of calcium or magnesium on acid oxyanion lead stabilization.

In U.S. Pat. No. 5,193,936, Pal and Yost describe a process in which gypsum and phosphoric acid (or appropriate calcium, sulfur and phosphorus substitutes) are sequentially added to contaminated lead soils and mixed in the presence of moisture and permitted to cure to produce a matrix consisting, according to the authors, of insoluble lead sulfate and lead phosphate complexes. The inventors, in this case, are making use of phosphate and sulfate oxyanions to produce insoluble lead-phosphate and lead-sulfate complexes.

In U.S. Pat. No. 4,701,219, Bonee discloses a method for reducing the leaching of vanadium and nickel from carbon and metal sorbents and catalysts used in petroleum cracking processes, by using either lime, calcium fluoride or calcium hydroxide, or a mixture of these compounds, as treatment agents. In this process, Bonee is using calcium, present in all the proposed treatment additives, to form a relatively insoluble calcium vanadate complex and a relatively insoluble hydroxy-nickel complex.

The use of sodium carbonate is proposed by a number of researchers for the purpose of forming metal carbonate complexes, to assist in the adjustment of pH for stabilization control, or to assist in the recovery of specific metals from solution.

In U.S. Pat. No. 5,202,033, Stanforth describes a method of treating solid waste in soil containing unacceptable levels of leachable metals such as lead, cadmium, arsenic, zinc, copper and chromium, using a phosphate source, a carbonate source or ferrous sulfate. Stanforth emphasizes that the treatment is accomplished by adding materials containing phosphates or carbonates that can enter into solution to form insoluble metal phosphates or metal carbonate compounds. Where chromium is present, Stanforth recommends the use of ferrous sulfate as a treatment additive to reduce hexavalent chromium, which is highly toxic, to tetravalent chromium, which is less toxic. Stanforth also recommends the use of a pH controlling agent to assist in the immobilization process. To supply a phosphate source, Stanforth recommends the use individually or in combination, of a number of phosphate salts as well as phosphoric acid. To supply a carbonate source, Stanforth recommends the use of sodium carbonate, sodium bicarbonate or calcium carbonate. For pH control, Stanforth recommends the use of magnesium oxide, magnesium hydroxide, calcium oxide and calcium hydroxide. It is noteworthy that Stanforth in his recommendation for soil treatment, suggests using, as a carbonate source, one or more carbonate salts including sodium bicarbonate, sodium carbonate or calcium carbonate. Stanforth's intent in his recommendation is to supply a carbonate source for the sole purpose of promoting the formation of metal carbonate complexes and makes no distinction between sodium or calcium carbonate. Stanforth, in fact, recommends the introduction of calcium and magnesium in several additives. There is no recognition by Stanforth of the interfering effects of calcium or magnesium on lead oxyanion treatment.

In U.S. Pat. No. 4,443,415, Queneau discloses a method for recovering vanadium from a petroleum coke residue by slurrying the coke in an aqueous solution of sodium carbonate to form sodium vanadate and sodium sulfate, and aerobically digesting the slurry at elevated temperatures under pressure to digest the carbon and to generate a vanadate liquor for recovery. The process described makes use of sodium carbonate and a high temperature and pressure process for vanadium recovery but makes no reference to its use to assist in the stabilization of lead bearing waste products.

In U.S. Pat. No. 4,645,651, Hähn proposes an alternative method for recovering vanadium from vanadium-bearing residues by combining the residues with a superstoichiometric quantity of a mixture of sodium carbonate and sodium sulfate, heating the mixture to its melting point and using a sodium carbonate solution to leach out the vanadium into solution. Once again the process described makes use of sodium carbonate to assist in the extraction of vanadium into a vanadate solution for recovery, but no reference to the use of sodium carbonate or the vanadate solution for lead stabilization is provided.

In U.S. Pat. No. 4,891,130, Pitts describes a method for recovering vanadium from an aluminosilicate material such as kaolin clay by using sodium carbonate or potassium carbonate to extract the vanadium as soluble alkali vanadate, preferably at a temperature near the boiling point of the alkali carbonate solution.

As previously noted, solidification processes use encapsulating reagents (e.g., cements) to retard contaminant migration.

In U.S. Pat. No. 4,049,462, Cocozza describes a solidification process in which desulfurization residues are treated to form a hardened cement-like mass by the addition of an alkaline reagent such as cement-kiln dust, which is a fine powdery waste product derived from the manufacture of Portland cement, in the presence of sufficient water, pH adjustment to 7 and one to two weeks of air drying. Similarly in U.S. Pat. No. 4,917,733, Hansen describes a process in which cement-kiln dust is added to fly ash collected from baghouses or precipitators of municipal waste combustors with excess lime and leachate from landfills to produce a hardened mortar-like material.

In U.S. Patent Reexamination Certificate No. B 13,837, 872, Connor describes a process in which an alkali-metal silicate is mixed with waste material and a silicate setting agent, from a group consisting of Portland cement, lime, gypsum and calcium chloride, to form a solidified silicate matrix within which the pollutants are entrapped.

In U.S. Pat. No. 4,375,986, Pichat describes a process in which waste material with a pH less than 2 is converted into a solid material using coal fly ash and a neutralizing agent such as lime or lime-containing materials or Portland cement. Pichat in his process emphasizes the economic advantages of using waste materials such as coal fly ash, which is pozzolanic, instead of Portland cement concrete or other solidifying reagents such as sodium silicates.

In U.S. Pat. No. 5,150,985, Roesky describes a process for treating low-lime content dusts collected from incinerator plants by mixing the dusts with cement and water, compacting the mixture into discrete shapes and hardening the mixture in an autoclave with saturated steam and a pressure of at least one bar.

As previously noted, washing processes have also been proposed for metal-bearing waste treatment.

In U.S. Pat. No. 5,009,793, Muller describes a process for separating heavy metals, including lead, from waste materials by treating the contaminated materials with mineral acids to dissolve the heavy metals as water soluble salts, followed by subsequent re-precipitation of the metals as hydroxides. In U.S. Pat. No. 5,045,115, Ginunder discloses a similar method for washing-out metals from the ash from combustion plants. The method involves a washing step to dissolve the metals, followed by subsequent treatment of the wash water to remove the metals from solution.

The process disclosed by the present invention does not rely on solidification or washing, as presented above, to mitigate leaching problems from lead contaminated wastes. It does not rely solely on pH control to buffer or adjust the pH of the waste to a narrow range where lead is insoluble. The process makes use of acid oxyanions to stabilize the lead in these waste materials, and alkali-metal carbonates to increase the efficiency of the lead stabilization process by reacting with elements (e.g., calcium and magnesium) that can preferentially react with acid oxyanions and thereby reduce their effectiveness as treatment reagents for heavy metals, such as lead.

None of the previous inventors, in their disclosures, have recognized the effectiveness of polyprotic acid oxyanions as a family of compounds that could stabilize lead-bearing waste materials. They have not recognized the interfering effects of multivalent noncarbonate hardness-producing elements, such as calcium and magnesium, in the treatment of lead-bearing wastes, nor have they recognized or identified the advantages of using alkali-metal carbonates to mitigate these effects.

It is noteworthy that elements comprising the cationic portions of fully dissociated polyprotic acid oxyanions, including such elements as phosphorus, boron, vanadium, arsenic, selenium, inorganic carbon, sulfur and chromium are present in many byproducts or waste materials, but are usually bound up in insoluble multivalent metal complexes, such as calcium and magnesium oxyanion complexes. It is possible to release these elements into solution by using alkali-metal carbonates to promote the formation of soluble sodium and potassium oxyanion salts and insoluble multivalent hardness-producing carbonates (e.g., calcium carbonate and magnesium carbonate). The use of sodium or potassium carbonate to extract vanadium from solids has been disclosed by others for the purpose of recovering vanadium in the form of sodium vanadate, but no prior inventions have disclosed the method of using titis approach to extract reagents for the purpose of lead stabilization. The release of these elements into solution to react with lead, to form insoluble lead oxyanion complexes, could make use of these byproducts or waste materials and avoid the need to add virgin sources of the aforementioned elements to stabilize waste materials. This could result in more favorable waste stabilization management and economics.

It is of further interest that many combustion or incineration processes (e.g., municipal solid waste or medical waste incineration) release acid gas (e.g., HCl or $SO_2$) that must be neutralized prior to release into the atmosphere to comply with air pollution emission regulations. The principal product used for acid gas control is quicklime or hydrated lime which is injected into the combustion gas stream. To achieve satisfactory efficiencies, excess lime (greater than stoichiometric acid requirements) is typically added in this process. Excess lime injected into the combustion gas stream of these processes is normally recaptured in baghouses or fabric filters and subsequently combined with the incineration residues or ash. In some processes this excess lime is used as an alkaline reagent to chemically stabilize the combustion residues. For example, in many municipal solid waste incinerators, in addition to its use in neutralizing acid gas emissions, excess lime is also injected into the combustion gas stream or air pollution control systems to assist in chemically stabilizing the cadmium in the incinerator ash so that cadmium leaching from the ash will not exceed allowable regulatory leaching levels. As previously outlined, this excess lime, which is helpful in stabilizing elements such as cadmium or zinc is not helpful and, in fact, can be detrimental to lead stabilization. It is also noteworthy that sodium carbonate or trona ore, from which sodium carbonate is derived, could be used as a substitute or in addition to lime in the neutralization of acid gas. The introduction of sodium carbonate or trona for acid gas treatment in concert with a polyprotic acid oxyanion could be used as an alternative method for both acid gas control and lead stabilization.

OBJECTIVES OF THE INVENTION

It is an objective of this invention to chemically stabilize lead, thereby reducing its solubility and its potential for leaching from lead-bearing waste materials, using soluble polyprotic acid oxyanion that will react with and form insoluble lead complexes when combined with the lead-bearing waste.

It is an objective of this invention to enhance the effectiveness of polyprotic acid oxyanion stabilization of lead by introducing an alkali-metal carbonate (such as sodium or potassium carbonate) as a treatment additive into lead-bearing wastes, containing noncarbonate hardness-producing elements (such as calcium and magnesium), to reduce the interfering effects of these elements, on the acid oxyanion lead stabilization process.

It is an objective of this invention to utilize alkali-metal carbonates for acid gas emission control, in concert with polyprotic acid oxyanions for lead stabilization to maximize the efficiency of the stabilization process.

It is an objective of this invention to make use of waste products, containing sources of polyprotic acid oxyanions, as stabilizing agents and to use alkali-metal carbonate along with these waste products if necessary to assist in acid oxyanion lead stabilization.

SUMMARY OF THE INVENTION

In keeping with the above referenced objectives and others that may become apparent, this invention includes the process of using the oxyanion (or conjugate base) of dissociated, polyprotic acids as stabilizing agents to chemically combine with or stabilize lead-bearing wastes. Included in the family of elements capable of forming such oxyanions are phosphorus, boron, sulfur, and carbon, as well as vanadium, arsenic, chromium, and selenium. The polyprotic acids of interest include phosphoric, boric, sulfuric, carbonic, vanadic, arsenic, chromic, and selenic, and the oxyanions of interest include phosphate, borate, sulfate, carbonate, vanadate, arsenate, chromate, and selenate. Each of these oxyanions is either a secondary or tertiary conjugate base of a weakly dissociated acid. They will all react with lead in solution to form insoluble lead complexes.

The inventor recognizes that previous patents have noted the potential for using various forms of phosphorus, boron, sulfur, and inorganic carbon, but there is no suggestion of the general effectiveness of the family of polyprotic acid oxyanions to react as lead stabilizing agents that include elements such as vanadium, selenium, arsenic and chromium.

Of perhaps greater importance, the inventor has also found that the presence of hardness causing elements (multivalent metal cations), particularly calcium and magnesium, in a lead contaminated waste or in the liquid extract surrounding the lead contaminated waste, can inhibit the release of soluble acid oxyanions into solution to react with lead, thereby reducing or eliminating the effectiveness of acid oxyanion treatment. The presence of soluble calcium or magnesium results in the formation of insoluble oxyanion complexes such as calcium or magnesium phosphate, calcium or magnesium sulfate, calcium or magnesium vanadate, etc. that interfere with the lead oxyanion reactions.

Since calcium and magnesium are normally present in many lead contaminated wastes, they represent a natural interference to acid oxyanion stabilizing agents. Calcium in particular is a major interfering element. As previously mentioned, lime (or calcium hydroxide) is used to stabilize many polyvalent metals. Hydrated lime or quicklime is commonly introduced into the air pollution control system of combustion processes for purposes of acid gas control. Examples of such processes include municipal waste or medical waste incineration. The presence of calcium that can enter into the solution will interfere with the effectiveness of the oxyanion reagents that form insoluble complexes with lead.

The inventor has found a remedy to this chemical interference. The introduction of sufficient amounts of alkali-metal carbonate, such as sodium or potassium carbonate, to these contaminated wastes will result in an increase in the solubility of the acid-oxyanion stabilizing agents for reaction with the lead in solution. This results because alkali metal carbonates will combine with hardness-producing elements such as calcium and magnesium, forming an insoluble carbonate complex (e.g., calcium carbonate).

Acid oxyanions can be added to the lead-bearing waste in either a solid or liquid form. Alkali-metal carbonates can also be added to the waste as a solid additive or as a soluble component of a liquid solution. To assist in the treatment of combustion residues, alkali-metal carbonates can be introduced into the air pollution control system or the combustion gas stream of combustion or incineration processes (e.g., municipal or medical waste) for acid gas control. Alkali-metal carbonate introduced in this manner can be used to reduce or replace lime as an acid gas treatment additive. The replacement of lime with alkali-metal carbonates for acid gas control, coupled with the direct addition of an acid oxyanion to the combustion residue can simultaneously reduce the available calcium in the residue and provide alkali-metal carbonate to reduce the interfering effects of any residual calcium or magnesium in the residue.

It is of further interest that many of the elements that are included within the family of elements that can form polyprotic acid oxyanions in solution are present in existing waste or byproduct materials. If these elements are released into solution, they are capable of forming acid oxyanions that can form insoluble complexes with lead. The addition of an alkali-metal carbonate to these wastes and byproduct materials can facilitate the release of these elements into solution. As a result, it is possible and may be economically practical in many instances to use such wastes or byproduct materials as a source of polyprotic acid oxyanions to stabilize other lead contaminated wastes or lead contained within their own matrix. Using waste materials or byproducts as a source of polyprotic acid oxyanions could provide a useful and economically attractive application for these wastes.

DESCRIPTION OF THE PREFERRED EMBODIMENT

The process of the present invention is a chemical stabilization process. It does not require any solidification to achieve the desired results. It does not require any washing to achieve the desired results. It does not immobilize lead by simply buffering or adjusting the pH of the waste within a narrow range. The process chemically immobilizes lead by introducing acid oxyanions into solution to react with lead and also introduces a second reagent, an alkali-metal carbonate, in an amount that maximizes the solubility of the acid oxyanion(s), to optimize the efficiency of the chemical stabilization process. The introduction of such effective amounts of an alkali-metal carbonate minimizes the adverse effects associated with the introduction of lime or air pollution control purposes or for the purpose of stabilizing other polyvalent heavy metals such as cadmium, nickel or zinc that may be present in the waste.

The treatment technology according to the present invention requires a multi-step evaluation process for determining the quantity of reagents required to treat lead-contaminated wastes. As used here, treatment means reducing the soluble lead content in a leaching test to acceptable levels. For most regulatory applications the leaching test used is the United States Environmental Protection Agency's (USEPA) Toxicity Characteristic Leaching Procedure (TCLP) test. This is a leaching test specified by the USEPA to determine whether a solid residue exhibits hazardous or nonhazardous leaching characteristics. The test is described in detail in 40 CFR, Part 261.24, Subpart C. The acceptable level in this test for lead is 5.0 milligrams per liter (mg/L). This is the regulatory threshold level for lead in the United States. If the lead concentration in this test exceeds 5.0 mg/L, the waste is hazardous.

The preferred embodiment described herein outlines a particular method for determining reagent requirements, but it is understood that various modifications may be made without departing from the scope of the invention.

The first step in the process requires the identification of the soluble lead available in the leaching test (e.g., TCLP test) and the amount of lead that will need to be removed from solution to achieve the acceptable lead level of 5.0 milligrams per liter.

The second step in the process requires a first approximation of the quantity of oxyanion needed to reduce the lead to levels prescribed in Step 1. The exact quantity of oxyanion required will be dependent on numerous factors which include, but are not limited to, the oxyanion type, the pH and redox potential of the waste-oxyanion mixture in solution, the concentration of other salts in the waste-oxyanion solution, and in particular, the presence of hardness-producing elements such as calcium and magnesium. Many of these factors will ultimately determine the insoluble lead-oxyanion complex that is formed in the process. A wide variety of lead-oxyanion complexes can be produced, some of which ultimately crystallize into minerals. A listing of some potential lead-oxyanion complexes are provided in Table 1. The first approximation of the quantity of oxyanion required can be achieved by examining the relative formula weights of lead to the specific oxyanion of interest, as listed in Table 1. An examination of Table 1 shows that the relative formula weights of lead to oxyanion range from about 5:3 to 1:2. As a first approximation, it is recommended that one formula weight of oxyanion for each formula weight of lead to be removed, or immobilized, be used to estimate the quantity of oxyanion required.

The third step involves the determination of the quantity of interfering hardness-producing elements. This will primarily be the soluble calcium and magnesium concentrations that are measured in the leaching test. As a first estimate, for each equivalent weight of calcium

TABLE 1

| LEAD-OXYANION COMPLEXES | | | |
|---|---|---|---|
| Oxyanion | Complex | Mineral Name | Lead:Oxyanion Formula Weight Ratio |
| Arsenate | $Pb_3(AsO_4)_2$ | — | 3:2 |
| | $Pb_5(AsO_4)_3Cl$ | Mimetite | 5:3 |
| Borate | $Pb_3(BO_3)_2$ | — | 3:2 |
| Carbonate | $PbCO_3$ | Cerussite | 1:1 |
| | $PbCO_3Cl_2$ | Phogenite | 2:1 |
| Chromate | $PbCrO_4$ | Crocoite | 1:1 |
| Phosphate | $Pb_3(PO_4)_2$ | — | 3:2 |
| | $Pb_5(PO_4)_3Cl$ | Pyromorphite | 5:3 |
| Selenate | $PbSeO_3$ | — | 1:1 |
| | $PbSeO_4$ | — | 1:1 |
| Sulfate | $PBSO_4$ | Anglesite | 1:1 |
| Vanadate | $Pb(VO_3)_2$ | — | 1:2 |
| | $Pb_3(VO_4)_2$ | — | 3:2 |
| | $Pb_5(VO_4)_3Cl$ | Vanadite | 5:3 |

and magnesium available in the leaching solution, one equivalent weight of alkali-metal carbonate should be considered as a treatment dose. In defining the stoichiometry of alkali-metal carbonate treatment, total calcium and magnesium concentration in the waste can be considered as an approximation of the upper limit of the total quantity of alkali-metal carbonate that may need to be considered to make full use of all acid oxyanions available and to account for the additional dissolution of noncarbonate hardness into solution that may occur during the alkali-metal carbonate treatment process. In many wastes the quantity of soluble calcium will be significantly higher than magnesium and, for practical purposes, it will be possible to disregard magnesium in the initial calculations.

Step 4 involves optimization testing. Since the presence of soluble salts and the pH of the solution can have substantive effects on the stoichiometry of the lead-oxyanion and calcium-alkali-metal carbonate or magnesium-alkali-metal carbonate reactions, optimization testing of the acid oxyanion and alkali-metal carbonate doses is recommended. Optimization testing requires the selection of incremental increases or decreases in reagent (oxyanion and/or alkali-metal carbonate) doses to determine the most cost-effective treatment doses.

The introduction of alkali-metal carbonate or trona, which contains a substantial fraction of sodium carbonate, into combustion gas streams for air pollution control will require calculation of the alkali-metal carbonate-acid gas stoichiometry requirements. Once the quantity of acid gas to be neutralized is determined, an excess quantity of alkali-metal carbonate or trona will be required and can be estimated as outlined in Steps 1 through 4, to treat the combustion residues. Calculations to determine the alkali-metal carbonate acid gas stoichiometry are readily known to most practitioners in the art of acid gas neutralization.

The efficiency of the chemical reactions that form insoluble lead-oxyanion complexes in the presence of alkali-metal carbonates will be affected by the temperature of the reactants and the solvent in which the reaction occurs and the presence of oxygen. The addition of direct or indirect heat to a blend of a lead-bearing waste product and the aforementioned reagents will enhance the treatment process. The purpose of heat addition is to raise the temperature of the blend of waste and treatment additives. This temperature increase will increase the solubility of oxyanions present in the waste, and at the same time decrease the solubility of calcium, and in particular calcium carbonate, which exhibits reverse temperature solubility (is less soluble at elevated temperatures). An increase in the concentration of oxyanions in solution and a decrease in the concentration of calcium (and its interfering effects) will result in more effective waste treatment. As long as the temperature is below the volatilization temperature of lead or the oxyanion in question, the efficiency of the process should be enhanced. To take full advantage of the addition of heat, the presence of moisture in the waste during the heating process should be maintained. This could be accomplished by minimizing moisture loss during the heating process by controlling exhaust air flow, or by the addition of steam heat. The addition of oxygen to the waste-oxyanion and alkali-metal carbonate solution, by agitating or bubbling air into the mixture or by some other means, will also increase the efficiency of the process. Excess oxygen assists in extracting bound oxyanions into solution and could be particularly effective when trying to extract oxyanions from other waste products.

TEST EXAMPLES

The results of a series of laboratory test examples are presented below to illustrate the treatment of lead using the aforementioned process. The examples are merely illustrative of this invention and are not intended to limit it thereby in any way.

Three different test procedures were used in the test examples. The first test procedure used was the United States Environmental Protection Agency's (USEPA) Toxicity Characteristic Leaching Procedure (TCLP) test. As previously outlined, this is a leaching test specified by the USEPA to determine whether a solid residue exhibits hazardous or non-hazardous leaching characteristics for the metals lead, cadmium, chromium, arsenic, mercury, selenium, silver and barium. The test is described in detail in 40 CFR Part 261.24, Subpart C. Wastes that fail the TCLP tests (leach in excess of specified criteria) are defined as hazardous wastes and require special handling and disposal practices. In general the test consists of the addition of 100 grams of a solid residue sample (reduced in size to minus 9.5 mm) to 2 liters of an acetic acid extract and agitation for 18 hours prior to filtering and testing of the extract for the aforementioned elements. The second test procedure used is known as Method 1312, and is described in Test Methods for Evaluating Solid Waste, Method 1312, USEPA SW-846, November 1992. This test procedure is similar to the TCLP test except synthetic acid rain extraction fluids are recommended for use instead of acetic acid. Distilled aleionized water was used in lieu of synthetic acid rain in the tests performed and described in this patent. The third test procedure used is known as the California Wet Test. This is a test that the State of California uses to determine whether a waste material exhibits hazardous leaching characteristics. In this test procedure 50 grams of a solid residue sample is reduced in size to minus 2 mm prior to the addition of ½ liter of a sodium citrate extract. Waste and extract are agitated for a total of 48 hours prior to filtering and testing of the extract for trace metals. The test procedure is described in detail in Barclays California Code of Regulations, Section 66261.126.

Example 1: Lead Stabilization with Chromium, Arsenic, Selenium, Sulfur and Vanadium The first test example is intended to illustrate the stabilizing potential of the above-referenced elements when contacted with lead in solution. In this test, six separate 2 liter samples of distilled deionized water containing 10 milligrams per liter (mg/L) of lead were prepared. To each respective 2 liter sample, measured doses of one of the five referenced elements (i.e., chromium, arsenic, selenium, sulfur and vanadium) were added, to produce a 10 mg/L concentration of each respective element in the 2 liter solution. To one sample (a control) no treatment additives were added. Lead was added to the solution as lead nitrate in 2% nitric acid. Chromium was added as potassium dichromate in distilled water. Arsenic was added as arsenic trioxide in 10% nitric acid. Selenium was added as selenium dioxide in distilled water. Sulfur was added as sodium sulfate, and vanadium was added as vanadium pentoxide in 5% hydrochloric acid. The pH of each solution was adjusted, after the addition of lead and the previously described additives, to a pH value of 5.0 using sodium hydroxide. The samples were agitated for hours and tested in accordance with Method 1312 criteria. Table 2A presents a listing of the specific reagents that were used in the first test example. Test results are presented in Table 2B.

TABLE 2A

REAGENTS AND QUANTITIES ADDED IN EXAMPLE 1 TESTS

| | Reagent | | | Test Samples | |
|---|---|---|---|---|---|
| Relevant[1] Cation | Cation Source | Solvent | Cation Concentration | Reagent Added to 2 Liter Sample | Target Cation Concentration (mg/L) |
| Pb | Lead Nitrate | 2% Nitric Acid | 1000 mg/L | 20 mL | 10 |
| Cr | Potassium Dichromate | Distilled Water | 1000 mg/L | 20 mL | 10 |
| As | Arsenic Trioxide | 10% Nitric Acid | 1000 mg/L | 20 mL | 10 |
| Se | Selenium Dioxide | Distilled Water | 1000 mg/L | 20 mL | 10 |
| S | Sodium Sulfate | Solid | 99% Sodium Sulfate | 0.09 g | 10 |
| V | Vanadium Pentoxide | 5% Hydrochloric Acid | 1000 mg/L | 20 mL | 10 |

[1]Pb as lead nitrate added to each test sample.

The results in Table 2B illustrate that at an extract pH (after 18 hours of agitation) of between 4.6 to 5.1, lead treatment was observed in all samples. The results suggest the formation of insoluble lead-chromate, lead-arsenate, lead selenate, lead-sulfate, and lead vanadate complexes in each respective test. Vanadium, chromium and arsenic were particularly effective treatment additives, reducing lead levels from solution at the referenced pH values by over 90 percent.

TABLE 2B

LEAD TREATMENT RESULTS USING SELECTED OXYANIONS EXAMPLE 1 RESULTS

| Treatment | Extract pH[1] | Extract Pb | % Treatment[2] |
|---|---|---|---|
| None | 4.7 | 10.1 | — |
| Cr | 4.6 | 0.6 | 95 |
| As | 4.9 | 1.1 | 90 |
| Se | 5.0 | 2.1 | 79 |
| S | 4.9 | 9.1 | 9.0 |
| V | 5.1 | 0.27 | 98 |

[1]PH measured after 18 hours of agitation.
[2]% treatment = [(10.1 − Extract Pb)/10.1] × 100

Example 2: Lead Stabilization with Vanadium and Phosphorus

The second test example is intended to illustrate the stabilizing potential of varying doses of vanadium and phosphorus and the effect of the pH of the solution on this treatment. In this test, a series of 2 liter samples of a liquid extract containing 10 mg/L of lead in solution were again prepared. Vanadium and phosphorus were separately added as stabilizing reagents to the 2 liter samples to provide a vanadate and phosphate acid oxyanion source for treatment. The vanadium was added as vanadium pentoxide in 5% hydrochloric acid, and the phosphorus was added as phosphoric acid. Measured doses of vanadium were added to produce vanadium solution concentrations in two separate 2 liter samples of 5 mg/L and 10 mg/L, respectively. A sufficient dose of phosphorus was added to a 2 liter lead sample to produce a phosphorus solution concentration of 5 mg/L. To one sample (a control) no vanadium or phosphorus was added. Two tests were run on each of the prepared samples. In the first test the pH was adjusted so that each sample extract pH was approximately pH 5.0. In the second test the pH was adjusted so that each sample extract was approximately pH 12.5. Adjustment of pH was made using calcium hydroxide (lime). The samples were agitated for 18 hours in accordance with Method 1312 test procedures. Table 3A presents a listing of the specific reagents that were used in the second test example. Test results are presented in Table 3B.

TABLE 3A

REAGENTS AND QUANTITIES ADDED IN EXAMPLE 2 TESTS

| | Reagent | | | Test Samples | |
|---|---|---|---|---|---|
| Relevant[1] Cation | Cation Source | Solvent | Cation Concentration | Reagent Added to 2 Liter Sample | Target Cation Concentration (Mg/L) |
| Pb | Lead Nitrate | 2% Nitric Acid | 1000 mg/L | 20 mL | 10 |
| V | Vanadium Pentoxide | 5% Hydrochloric Acid | 1000 mg/L | 10 mL | 5 |
| V | Vanadium Pentoxide | 5% Hydrochloric Acid | 1000 mg/L | 20 mL | 10 |
| P | Phosphoric Acid | Solid | 75% Phosphoric Acid | 0.04 g | 5 |

[1]Pb as lead nitrate added to each test sample.

TABLE 3B

RESULTS OF LEAD TREATMENT USING PHOSPHORUS AND VANADIUM IN ACIDIC AND ALKALINE EXTRACTS[1] EXAMPLE 2 RESULTS

I. Lead Levels in Vanadium-Treated Extracts

| | Vanadium Addition (mg/L) | | |
|---|---|---|---|
| Extract pH[2] | 0 | 5 | 10 |
| 5 | 10.7 | 0.26 | <0.25 |
| 12.5 | 9.5 | 4.7 | 2.8 |

TABLE 3B-continued

RESULTS OF LEAD TREATMENT USING PHOSPHORUS AND VANADIUM IN ACIDIC AND ALKALINE EXTRACTS[1] EXAMPLE 2 RESULTS

II. Lead Levels in Phosphorus-Treated Extracts

| | Phosphorus Addition (mg/L) | | |
|---|---|---|---|
| Extract pH[2] | 0 | 5 | — |
| 5 | 10.7 | 0.27 | — |
| 12.5 | 9.5 | 4.6 | — |

[1]Each extract tested contained 10 mg/L of Pb.
[2]pH was adjusted using calcium hydroxide or acetic acid.

The results presented in Table 3B are presented in two pans. Table 3B, Pan I lists the vanadium treatment results, and Table 3B, Pan II lists the phosphorus treatment results. The tabulated results illustrate that without the addition of vanadium or phosphorus into solution, lead concentrations at pH 5 and 12.5 were 10.7 and 9.5 mg/L, respectively. With the addition of 5 mg/L of vanadium or phosphorus, lead levels were reduced to 0.26 and 0.27 mg/L, respectively. When the pH was adjusted to pH 12.5 using lime (calcium hydroxide), lead stabilization was less effective. As will be shown in subsequent examples, this reduction in treatment efficiency was primarily due to the introduction of calcium in the form of lime or calcium hydroxide into solution. As the vanadium dose increased from 5 mg/L to 10 mg/L the treatment efficiency (reduction in lead concentration) increased.

Example 3: Calcium Interference in Vanadium Treatment

The third test example is intended to illustrate the interfering effects of calcium on vanadium treatment. In this test, 10 mg/L lead samples, prepared as described in Examples 1 and 2, were treated with 5 mg/L of vanadium. The pH of vanadium treated and untreated samples were adjusted with both (lime) and sodium hydroxide (caustic soda). Vanadium was added as vanadium pentoxide in 5% hydrochloric acid. Samples were agitated for 18 hours and tested in accordance with Method 1312 procedures. Table 4A presents a listing of the specific reagents that were used in the third test example. Test results are presented in Table 4B.

The results presented in Table 4B illustrate that lead treatment is possible with pH adjustment alone, using either lime or caustic soda without any vanadium treatment. The magnitude of treatment is pH dependent. At a pH level of 12.5, reduction in lead levels of only 5 percent or less were observed. When the pH was adjusted to 11.0 with either lime or caustic

TABLE 4A

REAGENTS AND QUANTITIES ADDED IN EXAMPLE 3 TESTS

| | Reagent | | | Test Samples | |
|---|---|---|---|---|---|
| Relevant Cation | Cation Source | Solvent | Cation Concentration | Reagent Added to 2 Liter Sample | Target Cation Concentration (mg/L) |
| Pb | Lead Nitrate | 2% Nitric Acid | 1000 mg/L | 20 mL | 10 |

TABLE 4A-continued

REAGENTS AND QUANTITIES ADDED IN EXAMPLE 3 TESTS

| | Reagent | | | Test Samples | |
|---|---|---|---|---|---|
| Relevant Cation | Cation Source | Solvent | Cation Concentration | Reagent Added to 2 Liter Sample | Target Cation Concentration (mg/L) |
| V | Vanadium Pentoxide | 5% Hydrochloric Acid | 1000 mg/L | 10 mL | 5 |

TABLE 4B

RESULTS OF LEAD TREATMENT WITH VANADIUM IN pH ADJUSTED SAMPLES USING CALCIUM HYDROXIDE AND SODIUM HYDROXIDE[1] EXAMPLE 3 RESULTS

| V Added (mg/L) | pH Adjustment | Extract pH | Extract Pb (mg/L) | % Treatment[2] |
|---|---|---|---|---|
| 0 | Lime | 11.0 | 3.5 | 65 |
| 0 | Lime | 12.5 | 9.5 | 5 |
| 5 | Lime | 12.2 | 4.5 | 55 |
| 0 | Caustic Soda | 11.0 | 5.0 | 50 |
| 0 | Caustic Soda | 12.5 | 10.0 | 0 |
| 5 | Caustic Soda | 11.7 | <0.25 | >97.5 |

[1]Each extract tested contained 10 mg/L Pb.
[2]% Treatment = [(10 − Extract Pb)/10] × 100.

soda, lead treatment ranged from 50 to 65 percent. This treatment is due to presence of carbonate in solution at these somewhat lower pH levels and the formation of insoluble lead carbonate complexes. Of greater relevance to the subject invention is the difference in vanadium treatment when vanadium is added to solutions that are pH-adjusted with lime, versus solutions that are pH-adjusted with caustic soda. Vanadium treatment with caustic soda pH adjustment exhibited a lead extract reduction in excess of 97.5 percent, while lime adjusted pH samples exhibited a lead extract reduction of only 55 percent. Both tests were similar with the exception of the presence of calcium in the lime pH-adjusted sample versus sodium in the caustic soda pH-adjusted sample. These results suggest a calcium interference in vanadium treatment.

Example 4: Vanadium and Phosphorus Treatment of Municipal Waste Combustor Fly Ash The fourth test example is intended to illustrate treatment of an actual waste product containing high calcium and high levels of lead using both vanadium and phosphorus treatment. The waste material used in this example was municipal waste combustor fly ash. Municipal waste combustor ash fly ash is a solid residue that is collected in the air pollution control systems of a municipal solid waste combustor. The fly ash used in these tests was collected from the baghouse of a combustor containing a dry scrubbing lime injection system for acid gas control. This type of air pollution control system is typical of modern municipal solid waste combustors. The fly ash had the consistency of a fine powder and contained lime concentrations in excess of 15 percent and lead concentrations in the range of 3000 to 4000 milligrams per kilogram. Tests were conducted in accordance with Method 1312 procedures. In these tests, 100 gram samples of fly ash were added to separate 2 liter distilled aleionized water extracts, containing 0, 25, 50 and 100 mg/L of vanadium or phosphorus, respectively. The vanadium was added as vanadium pentoxide and the phosphorus was added as phosphoric acid. Each sample was agitated for 18 hours, filtered and tested. Table 5A presents a listing of the specific reagents that were used in the fourth test example. Test results are presented in Table 5B.

TABLE 5A

REAGENTS AND QUANTITIES ADDED IN EXAMPLE 4 TESTS

| | Reagent | | | Test Samples | |
|---|---|---|---|---|---|
| Relevant Cation | Cation Source | Solvent | Cation Concentration | Reagent Added to 2 Liter Sample | Target Cation Concentration (mg/L) |
| V | Vanadium Pentoxide | 5% Hydrochloric Acid | 1000 mg/L | 50 mL | 25 |
| V | Vanadium Pentoxide | 5% Hydrochloric Acid | 1000 mg/L | 100 mL | 50 |
| V | Vanadium Pentoxide | 5% Hydrochloric Acid | 1000 mg/L | 200 mL | 100 |
| P | Phosphoric Acid | Solid | 75% Phosphoric Acid | 0.2 g | 25 |
| P | Phosphoric Acid | Solid | 75% Phosphoric Acid | 0.4 g | 50 |
| P | Phosphoric Acid | Solid | 75% Phosphoric Acid | 0.8 g | 100 |

The results illustrate a lead solubility of 35 mg/L in an untreated sample. Increasing vanadium dosages provided increasing degrees of treatment. Phosphorous treatment was not apparent until 100 mg/L of phosphorus was added. As will be illustrated in subsequent examples, the presence of lime inhibits the stabilization reaction, and limits both vanadium and phosphorus treatment efficiencies.

Example 5: Lead Stabilization in Municipal Waste Combustor Fly Ash with Phosphoric Acid and Alkali-Metal Carbonate Treatment The fifth test example is intended to illustrate the benefits of adding an alkali-metal carbonate (in this case sodium carbonate) along with phosphorus to increase the effectiveness of the lead-phosphorus stabilization process. Samples of municipal waste combustor fly ash, similar

TABLE 5B

MUNICIPAL WASTE COMBUSTOR FLY ASH LEAD TREATMENT WITH VANADIUM AND PHOSPHORUS EXAMPLE 4 RESULTS

| V or P[1] | Vanadium Treatment Results | | | Phosphorus Treatment Results | | |
|---|---|---|---|---|---|---|
| Amount Added (mg/L) | Extract Pb (mg/L) | % Treatment[2] | Extract PH | Extract Pb (mg/L) | % Treatment[2] | Extract pH |
| 0 | 35.0 | — | 12.4 | 35.0 | — | 12.4 |
| 25 | 23.9 | 32 | 12.3 | 38.6 | −10 | 12.4 |
| 50 | 13.6 | 61 | 12.3 | 39.0 | −11 | 12.4 |
| 100 | 7.5 | 79 | 12.1 | 31.8 | 9 | 12.4 |

[1]Sufficient vanadium and phosphorus was added to yield the reference concentrations in the extract solution prior to sample agitation.
[2]% Treatment = [(35 − Extract Pb)/35] × 100.

to the samples described in Example 4, were subjected to Method 1312 test procedures using distilled deionized water as the extract solution with the addition of small amounts of phosphoric acid and sodium carbonate. Table 6A presents a listing of the specific reagents that were used in the fifth test example. Test results are presented in Table 6B.

TABLE 6A

REAGENTS AND QUANTITIES ADDED IN EXAMPLE 5 TESTS

| | Reagent | | | Test Samples | |
|---|---|---|---|---|---|
| Relevant Cation | Cation Source | Solvent | Cation Concentration | Reagent Added to 2 Liter Sample | Target Cation Concentration (mg/L) |
| P | Phosphoric Acid | Solid | 75% Phosphoric Acid | 0.08 g | 10 |

The results presented in Table 6B illustrate (as was shown in Example 4) that phosphoric acid alone, at the dosage applied, provided no measurable lead stabilization for the municipal waste combustor fly ash. The addition of sodium carbonate to the waste, however, produced a dramatic increase in treatment efficiency. The addition of 5.0 grams (g) and 10.0 g of sodium carbonate to the fly ash and phosphoric acid resulted in lead treatment efficiencies of 67 and 82

TABLE 6B

LEAD REDUCTION IN MUNICIPAL WASTE COMBUSTOR FLY ASH DUE TO PHOSPHORIC ACID TREATMENT AND SODIUM CARBONATE[1] EXAMPLE 5 RESULTS

| Phosphoric[2] Acid Addition (g) | Sodium Carbonate Addition (g) | Extract Pb (mg/L) | % Treatment[3] | Extract pH |
|---|---|---|---|---|
| 0 | 0 | 43 | — | 12.3 |
| 0.08 | 0 | 43 | 0 | 12.3 |
| 0.08 | 5.0 | 14.1 | 67 | 12.4 |
| 0.08 | 10.0 | 7.7 | 82 | 12.3 |
| 0 | 20.0 | 42 | 1 | 12.3 |

[1]Fly ash sample was 100 grams minus the quantity of phosphoric acid added.

TABLE 6B-continued

LEAD REDUCTION IN MUNICIPAL WASTE COMBUSTOR FLY ASH DUE TO PHOSPHORIC ACID TREATMENT AND SODIUM CARBONATE[1] EXAMPLE 5 RESULTS

| Phosphoric[2] Acid Addition (g) | Sodium Carbonate Addition (g) | Extract Pb (mg/L) | % Treatment[3] | Extract pH |
|---|---|---|---|---|

[2]Technical grade phosphoric acid consisting of 75 percent phosphoric acid was added.
[3]% Treatment = [(43 − Extract Pb)/43] × 100.

percent, respectively. The results also illustrate that sodium carbonate, when added alone without phosphorus, does not provide effective treatment but requires the presence of phosphorus introduced as phosphoric acid.

Example 6: Treatment of Municipal Waste Combustor Fly Ash with Oil-Fired Power Station Boiler Ash It was previously noted that the presence of elements in waste products that can form oxyanions in solution can be used to stabilize lead-bearing wastes. Example 6 is intended to illustrate the potential use of such waste products in stabilizing lead-bearing materials. The waste product used in Example 6 was ash produced at an oil-fired power station. Residues from the blurring of heavy residual fuel oils can contain vanadium concentrations in excess of 3 percent by weight. In this test, oil-fired power plant boiler ash was blended with municipal waste combustor fly ash, with and without sodium carbonate, and subjected to Method 1312 test procedures using distilled aleionized water as the extraction fluid. The results are presented in Table 7.

The results illustrate that the addition of oil ash in the presence of sodium carbonate produces a significant reduction in lead solubility. Lead treatment efficiencies of over 90 percent were achieved with oil ash and sodium carbonate treatment. Oil ash by itself is not as effective even at high oil ash levels. This is due to the high lime and calcium content of the fly ash. Sodium carbonate by itself is ineffective due to the absence of an oxyanion to produce an insoluble lead complex.

TABLE 7

OIL, ASH AND SODIUM CARBONATE TREATMENT OF MUNICIPAL WASTE COMBUSTOR FLY ASH EXAMPLE 6 RESULTS

| Oil Ash Addition (g) | Sodium Carbonate Addition (g) | Extract Pb (mg/L) | % Treatment[2] | Extract pH |
|---|---|---|---|---|
| 0 | 0 | 43 | — | 12.3 |
| 0 | 20 | 42 | 1 | 12.3 |
| 1 | 10 | 6.2 | 85 | 12.4 |
| 2.5 | 10 | 3.5 | 92 | 12.4 |
| 2.5 | 0 | 20 | 53 | 12.3 |

[1]Fly ash sample was 100 g minus the quantity of oil ash added.
[2]% Treatment = [(43 − Extract Pb/43) × 100].

Example 7: TCLP Test Results Using Oil Ash to Treat Municipal Waste Combustor Bottom Ash Example 7 is intended to illustrate the effectiveness of adding oil ash to bottom ash from municipal waste combustors as measured by the TCLP test. Bottom ash is the residue from the combustion of the solid waste. It does not contain any air pollution control residues. TCLP test results using TCLP extraction fluid No. 2 was used in a series of tests in which increasing concentrations of oil ash was added to a series of 100 gram bottom ash samples. The results are presented in Table 8.

TABLE 8

TCLP TEST RESULTS USING OIL ASH TREATMENT OF BOTTOM ASH[1] EXAMPLE 7 RESULTS

| Oil Ash Addition (g) | Extract Pb (mg/L) | % Treatment[2] | Extract pH |
|---|---|---|---|
| 0 | 4.8 | — | 4.8 |
| 5 | 4.0 | 17 | 4.7 |
| 10 | 3.0 | 38 | 4.6 |
| 20 | 1.6 | 67 | 4.5 |

[1]Bottom ash sample was 100 g minus the quantity of oil ash added.
[2]% Treatment = [(4.8 − Extract Pb)/4.8] × 100

The results show that increasing levels of oil ash added to bottom ash result in more effective stabilization of the lead in the bottom ash samples. It should be noted that the total amount of oil ash plus bottom ash used in the test was 100 grams. Increasing quantities of oil ash decrease the quantity of bottom ash used in the test. The dilution effect is not accounted for in the results presented in Table 8. Nonetheless, the treatment levels far outweigh any effects of diluting the bottom ash sample with oil ash addition.

Example 8: California Wet Test Results Using Oil Ash to Treat Municipal Waste Combustor Combined Ash Example 8 is intended to illustrate the effectiveness of adding oil ash to combined ash from municipal waste combustors as measured by the California Wet Test. Combined ash is the mixed residue of bottom ash and fly ash produced in municipal waste combustors. It generally consists of approximately 85 percent bottom ash and 15 percent fly ash. Table 9 presents the results of these tests.

TABLE 9

CALIFORNIA WET TEST RESULTS USING OIL ASH TREATMENT OF COMBINED ASH[1] EXAMPLE 8 RESULTS

| Oil Ash Addition (g) | Extract Pb (mg/L) | % Treatment[2] | Extract pH |
|---|---|---|---|
| 0 | 7.9 | — | 7.7 |
| 0.5 | 2.0 | 75 | 8.2 |

[1]Combined ash sample was 50 grams minus the quantity of oil ash added.
[2]% Treatment = [(7.9 − Extract Pb)/7.9] × 100

The results indicate a significant reduction in lead leachability due to oil ash addition to the combined ash sample.

I claim:

1. A method of immobilizing leachable lead in a lead contaminated waste material containing hardness-producing elements selected from calcium and magnesium, wherein the method comprises the steps of contacting said waste material with an alkali-metal carbonate, in an amount sufficient to react with said hardness-producing elements, and a soluble polyprotic acid oxyanion in solution.

2. The method of immobilizing leachable lead in a lead contaminated waste material as in claim 1, wherein the method comprises the steps, in sequence, of forming a mixture of said waste material by contacting said waste material with said alkali-metal carbonate, and adding said soluble polyprotic acid oxyanion.

3. The method of immobilizing leachable lead in a lead contaminated waste material as in claim 1, wherein the method comprises the steps, in sequence, of forming a mixture of said waste material with salt soluble polyprotic acid oxyanion, and adding said alkali metal carbonate to said mixture.

4. The method of immobilizing lead in a lead contaminated waste material as in claim 1, wherein said alkali-metal carbonate and acid oxyanion may be introduced directly to the contaminated waste in a liquid or solid form.

5. The method of immobilizing lead in a lead contaminated waste material as in claim 1, further comprising the step of introducing said alkali-metal carbonate into the combustion gas stream of an incinerator or boiler, in an excess amount required for acid gas control, for purposes of acid gas control and lead immobilization.

6. The method of immobilizing lead in a waste material as in claim 1, wherein said waste material is a residue from the combustion of municipal waste.

7. The method of immobilizing lead in a waste material as in claim 1, wherein said waste material is a residue from the combustion of medical waste.

8. The method of immobilizing lead in a waste material as in claim 1, wherein said waste material is a residue from the treatment of lead contaminated wastewater.

9. The method of immobilizing lead in a waste material as in claim 1, wherein said alkali-metal carbonate consists essentially of sodium carbonate.

10. The method of immobilizing lead in a waste material as in claim 1, wherein said alkali-metal carbonate consists essentially of potassium carbonate.

11. The method of immobilizing lead in a waste material as in claim 1, wherein said alkali-metal carbonate consists essentially of a mixture of sodium carbonate and potassium carbonate.

12. The method of immobilizing lead in a waste material as in claim 1, wherein said polyprotic acid oxyanion is a phosphate, selected from the group consisting of a phosphate salt, a phosphorus oxide or phosphoric acid.

13. The method of immobilizing lead in a waste material as in claim 1, wherein said polyprotic acid oxyanion is a borate, selected from the group consisting of a borate salt, a boron oxide or boric acid.

14. The method of immobilizing lead in a waste material as in claim 1, wherein said polyprotic acid oxyanion is a vanadate, selected from the group consisting of a vanadate salt, a vanadium oxide or vanadic acid.

15. The method of immobilizing lead in a waste material as in claim 1, wherein said polyprotic acid oxyanion is a selenate, selected from the group consisting of selenate salt, a selenium oxide or selenic acid.

16. The method of immobilizing lead in a waste material as in claim 1, wherein said polyprotic acid oxyanion is an arsenate, selected from a group consisting of arsenate salt, an arsenic oxide or arsenic acid.

17. The method of immobilizing lead in a waste material as in claim 1, wherein said polyprotic acid oxyanion is a carbonate, selected from the group consisting of a carbonate salt, a carbon oxide or carbonic acid.

18. The method of immobilizing lead in a waste material as in claim 1, wherein said polyprotic acid oxyanion is a chromate, selected from the group consisting of chromate salt, a chromium oxide or chromic acid.

19. The method of immobilizing lead in a waste material as in claim 1, wherein said polyprotic acid oxyanion is a sulfate, selected from the group consisting of a sulfate salt, a sulfur oxide or sulfuric acid.

20. The method of immobilizing lead in a waste material as in claim 1, wherein said polyprotic acid oxyanion is comprised of a mixture of one or more oxyanions consisting of a phosphate, borate, vanadate, selenate, arsenate, carbonate, chromate and sulfate selected from a group consisting of an oxide, a salt or an acid.

21. The method of claim 1 further comprising the step of adding heat to said mixture.

22. The method of claim 1, further comprising the step of adding oxygen to said mixture.

23. A method of immobilizing lead in a lead bearing waste material, comprising contacting said lead bearing waste with a soluble polyprotic acid oxyanion in solution, wherein said oxyanion in solution is added as part of a waste or by-product material, wherein said waste or by-product material is a residue of heavy residual oil-fired boilers, and wherein said residue contains a vanadate salt, a vanadium oxide or vanadic acid, and wherein further said waste is capable of releasing a vanadate oxyanion into solution, and forming lead-vanadate complexes.

* * * * *